United States Patent
Khaleel et al.

(10) Patent No.: US 11,890,596 B2
(45) Date of Patent: Feb. 6, 2024

(54) COKING RESISTANT NIFEAL CATALYST FOR PARTIAL OXIDATION OF METHANE TO SYNTHESIS GAS

(71) Applicant: United Arab Emirates University, Al-Ain (AE)

(72) Inventors: Abbas Khaleel, Al-Ain (AE); Abdul Rasheed Pillantakath, Al-Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 17/468,070

(22) Filed: Sep. 7, 2021

(65) Prior Publication Data
US 2023/0070707 A1 Mar. 9, 2023

(51) Int. Cl.
*B01J 23/755* (2006.01)
*B01J 21/04* (2006.01)
*C01B 3/38* (2006.01)

(52) U.S. Cl.
CPC ............. *B01J 23/755* (2013.01); *B01J 21/04* (2013.01); *C01B 3/386* (2013.01); *C01B 2203/0261* (2013.01); *C01B 2203/1058* (2013.01); *C01B 2203/1241* (2013.01)

(58) Field of Classification Search
CPC ................................ B01J 23/755; B01J 21/04
USPC .......................................................... 502/337
See application file for complete search history.

(56) References Cited

U.S. PATENT DOCUMENTS

| | | | | |
|---|---|---|---|---|
| 2005/0096215 A1* | 5/2005 | Espinoza | ................ | C01B 3/386 502/302 |
| 2010/0150823 A1* | 6/2010 | Huang | ...................... | C01B 3/48 502/335 |
| 2014/0332725 A1* | 11/2014 | D'Souza | ................ | B01J 35/023 252/373 |

FOREIGN PATENT DOCUMENTS

WO WO2008047321 * 4/2008

* cited by examiner

*Primary Examiner* — Douglas B Call
(74) *Attorney, Agent, or Firm* — Hayes Soloway P.C.

(57) ABSTRACT

A novel NiFeAl-based catalytic material was developed for the conversion of methane, the main constituent of natural gas, to synthesis gas, which is a mixture of $H_2$ and CO in a $H_2$/CO molar ratio of 2, through partial oxidation by air at reasonable temperatures.

16 Claims, 2 Drawing Sheets

COKING RESISTANT NIFEAL CATALYST FOR PARTIAL OXIDATION OF METHANE TO SYNTHESIS GAS

TECHNICAL FIELD

The present invention relates to novel coking resistant NiFeAl catalyst for partial oxidation of methane to synthesis gas.

BACKGROUND OF THE INVENTION

Although increasing amounts of natural gas are being discovered and produced, it is still underutilized as a source of clean energy in a way that reduces dependence on petroleum oil. This is due to different technical challenges including the high stability and costly storage of methane, $CH_4$, which represents the major component of natural gas. Therefore, different routes of $CH_4$ conversion to more efficient feedstocks have been widely studied including steam reforming [1] and partial oxidation (POM) [2]. These routes are based on catalytic reactions, where the performance depends mainly on different characteristics of the catalyst. Catalysts that exhibit high activity in all methane conversions are usually based on noble metals including Pt, Pd, Ru, and Rh. Promising catalytic activity has been also shown by non-noble metals, especially Ni and Co [3]. Ni has been the most commercially potential candidate due to its lower costs compared with other active metals.

The commercially employed methane conversion process is steam reforming, where $CH_4$ reacts with steam over Ni-based catalysts to produce syngas that is processed further to different hydrocarbons [1]. However, this process suffers some drawbacks including catalyst deactivation and high energy requirement due to the high endothermicity of the reaction. Therefore, POM and other routes are widely investigated as alternatives. POM, which is based on $CH_4$ reaction with $O_2$ as shown in equation (1) below, has a significant advantage over the other routes since its reaction is exothermic, and produces syngas in high yields with a $H_2/CO$ ratio very close to 2, as desired for gas-to-liquid technology [4]. However, the process over all of the active catalysts, to date, suffer from coke formation during reactions that lead to rapid deactivation. The coke that accumulates on the catalysts is also associated with other problems including blockage of reactors which result in unsafe pressure buildups.

$$CH_4 + \tfrac{1}{2}O_2 \rightarrow 2H_2 + CO, \Delta H°_{298} = -36 kJ/mole \quad (1)$$

Several recent studies have focused on improving the performance of Ni-based catalysts by doping with other metals [5-10]. As an example, doping with Ru has been reported to decrease coke formation during partial oxidation of methane [5]. The addition of Ru was also found to enhance carbon gasification [6]. Rhenium and rhodium are other metals that have shown improvement to Ni catalysts' performance where they were found to enhance nickel reducibility resulting in a noticeable increase in the $CH_4$ conversion during partial oxidation reactions [7-10]. However, those metal modifiers are based on expensive metals, and the coke formation problem was never completely solved. Other studies have reported on the use of basic metal oxides as catalyst supports in efforts to reduce coke formation including MgO [11,12], CaO [13,14], $C_eO_2$ [15], and $La_2O_3$ [16]. In these studies, it was observed that more basic oxide supports were associated with lower carbon deposits. Despite some success reported in these studies, coke formation still presents a challenge.

Conversion of methane via syngas is considered the most efficient route for better utilization of natural gas. The only currently commercial technology that converts natural gas to syngas, and then to liquid fuels, is based on catalytic steam reforming of methane which is an endothermic reaction that requires high temperatures, around 900° C. The catalytic materials that are industrially employed are based on Ni supported on aluminum oxide, $Ni/Al_2O_3$. One of the major drawbacks of $Ni/Al_2O_3$-based catalysts is the formation of carbon coke that accumulates on the surface of the catalysts resulting in their deactivation. The accumulated carbon also results in hindering gases diffusion leading to pressure buildup and hence, safety concerns. Those problems eventually result in an increase in the processing costs.

One of the promising routes for natural gas conversion, which is not commercialized yet, is based on partial oxidation of methane to syngas. In this process, Ni-based catalysts are the most widely studied catalysts due to the low cost of Ni compared to noble metals, which are the most active for this process. Again, the problem of coking is a major drawback where improvement is needed for the process to be commercially feasible.

SUMMARY OF THE EMBODIMENTS

Disclosed herein is an invention directed at a new catalytic material composed of Ni supported on high-surface-area Fe-doped $\gamma$-$Al_2O_3$.

In representative embodiments, the catalyst of the present invention is composed of Ni supported over Fe-doped $\gamma$-$Al_2O_3$, where the Ni concentration is approximately 10% of the catalyst by weight and the Fe:Al molar ratio in the support is in the range of 0.03:0.97-0.05:0.95.

In another embodiment, the molar concentration of the elements of the catalyst of the present invention that has Fe:Al molar ratio of 0.03-0.97 is approximately 16.4% Ni, 1% Fe, 32.5% Al, and 50.1% O.

In other representative embodiments, the invention is directed at a NiFeAl-based catalyst for use in the conversion of natural gas to synthesis gas, which is a mixture of $H_2$ and CO in a $H_2/CO$ molar ratio of approximately 2.

In further representative embodiments. the invention is directed at a method for the conversion of methane ($CH_4$) into synthesis gas, utilizing a NiFeAl based catalyst, where the synthetic gas produced has a $H_2$ to CO molar ratio of approximately 2.

In other embodiments, the synthesis gas produced by the conversion of methane ($CH_4$) into synthesis gas can be further processed to produce liquid fuels and other other value-added chemicals.

BRIEF DESCRIPTION OF THE FIGURES

FIG. 3A XRD patterns, FIG. 3B TGA profiles, FIG. 3C Raman spectra, and FIG. 3D images of the catalysts before and after reaction.

DETAILED DESCRIPTION OF SPECIFIC EMBODIMENTS

Figure 1:
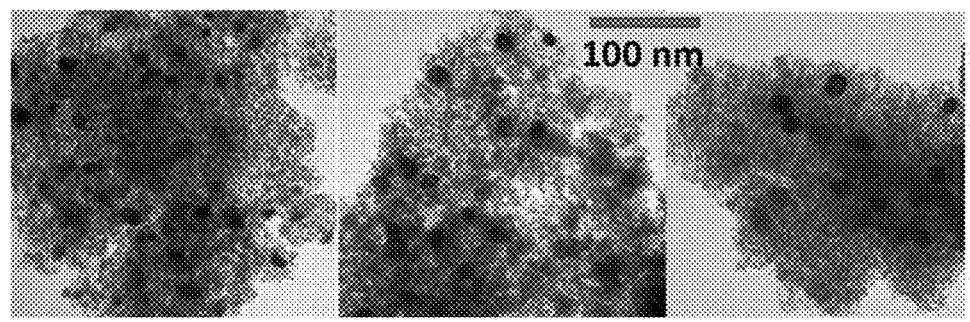
FIG. 1. TEM images of selected catalyst samples.

The current invention involves a new composite material that provides a solution to the coking problem where tests in long term reactions have shown that coking can be completely prevented.

The novelty of the new catalytic material stems from its significantly higher resistance to coke formation during reactions leading to longer life-time and higher efficiency. Coking during natural gas conversions has been one of the major causes of catalysts' deactivation. In addition, carbon deposits usually block reactors resulting in unsafe pressure buildup. These drawbacks of the currently employed catalysts increase the operation costs. Therefore, the coking resistance that the new catalytic material exhibits provides a solution to the most severe problem associated with the currently employed and widely studied catalysts for natural gas conversion processes, and leads to more robust, durable, safe, efficient, and cost-effective naturel gas conversion processes.

Disclosed herein is a NiFeAl-based catalyst for use in the conversion of natural gas to synthesis gas, which is a mixture of $H_2$ and CO in a $H_2$/CO.

The $Ni/Al_2O_3$ catalyst of the present invention was modified with a low-cost metal, Fe, using cost-effective preparation process. A novel NiFeAl-based catalyst was prepared and was tested in POM reaction at 700° C., where around 91% methane conversion was obtained with selectivity to $H_2$ and CO close to 99%, and almost zero coke formation after 100 hrs on-stream.

Furthermore, the $H_2$:CO ratio was 2.02 (±0.01) as desired for Fischer-Tropsch synthesis. The prepared catalyst was compared with other related reference catalysts and its novel performance and durability was confirmed. The unique behavior of the new catalyst was supported by, and was explained based on, results from different experimental techniques. No other materials have shown similar suppression of coke formation and stable methane conversion in POM.

In a first embodiment, disclosed herein is a catalyst composed of Ni supported over Fe-doped $\gamma\text{-}Al_2O_3$, where the Ni concentration is approximately 8 to 12% of the catalyst by weight and the Fe:Al molar ratio in the support is in the range of 0.030:0.970-0.050:0.950.

In another embodiment, the Ni concentration is approximately 9 to 11% of the catalyst by weight and the Fe:Al molar ratio in the support is in the range of 0.030:0.970-0.050:0.950.

In another embodiment, the Ni concentration is approximately 10% of the catalyst by weight and the Fe:Al molar ratio in the support is in the range of 0.030:0.970-0.050:0.950.

In another embodiment, the molar concentration of the elements of the catalyst of the present invention is approximately 16.4% Ni, 1% Fe, 32.5% Al, and 50.1% O.

In a second embodiment, disclosed herein is a NiFeAl-based catalyst for converting methane into synthesis gas, where the efficiency of the process of conversion of methane into synthesis gas ranges approximately from 85 to 100%.

In a preferred embodiment, the efficiency of the process of conversion of methane into synthesis gas ranges approximately from 95 to 99%.

In a most preferred embodiment, the efficiency of the process of conversion of methane into synthesis gas is approximately from 91%.

In another embodiments, the selectivity of the process of conversion of methane into synthesis gas is approximately 95 to 100%.

In a preferred embodiments, the selectivity of the process of conversion of methane into synthesis gas is approximately 97 to 99%.

In a most preferred embodiments, the selectivity of the process of conversion of methane into synthesis gas is approximately 98%.

In another most preferred embodiment, the catalyst of the present invention produces high methane conversion (around 91%) and selectivity to syngas around 99%, with $H_2$:CO molar ratio of 2.02 (±0.01) as desired for Fischer-Tropsch synthesis.

Disclosed herein is a method for the conversion of methane ($CH_4$) into synthesis gas, utilizing a NiFeAl based catalyst, where the synthetic gas produced has a $H_2$ to CO ratio of approximately 2.

In an another embodiment, disclosed herein is a method for the conversion of methane ($CH_4$) into synthesis gas method for the conversion of methane ($CH_4$) into synthesis gas, where the efficiency of the process of conversion of methane into synthesis gas ranges approximately from 85 to 100%.

In a preferred embodiment, where the efficiency of the process of conversion of methane into synthesis gas ranges approximately from 95 to 99%.

In a most preferred embodiment, where the efficiency of the process of conversion of methane into synthesis gas is approximately from 91%.

In a further embodiment, the selectivity of the process of conversion of methane into synthesis gas is approximately 95 to 100%.

In a preferred embodiment, the selectivity of the process of conversion of methane into synthesis gas is approximately 97 to 99%.

In a most preferred embodiment, the selectivity of the process of conversion of methane into synthesis gas is approximately 98%.

In another most preferred embodiment, the method of the present invention produces high methane conversion (around 91%) and selectivity to syngas around 99%, with $H_2$:CO ratio of 2.02 (±0.01) as desired for Fischer-Tropsch synthesis.

In one embodiment, high syngas selectivity doesn't require the addition of any other material in the reactants feed other than air and methane.

In another embodiment, the amount of carbon deposit produced in the process of conversion of methane into synthesis is approximately zero, whether measured in grams or moles.

In another embodiment, the present invention unique benefits include longer life-time, durability, compared with existing catalysts since the deactivation problem that usually results from carbon deposits is completely solved. Further, the process of conversion is safe as a result of avoiding pressure buildup due to reactor blocking that usually results from carbon deposits, and is highly efficient as a result of protecting the Ni active sites from being blocked by carbon. Also, the catalyst' preparation requires a minimum number of steps, without the need for high temperatures or pressures, and the process is of low cost as it depends on abundant cost-effective elements.

In yet another embodiment, the synthesis gas produced by the conversion can be further processed to produce liquid fuels and other chemicals.

The present invention has a significant impact in developing more efficient and commercially feasible technology for better utilization of natural gas through methane conversion to liquid fuels and other value-added products to the benefit of the gas industry sector and related industries. No disadvantages are associated with the invented material and no limitations to its implementation are anticipated.

Materials and Preparation

The Catalyst Composition

The invented catalyst is composed of Ni supported over Fe-doped $\gamma$-$Al_2O_3$, where the Ni concentration is 10% of the catalyst by weight and the Fe:Al molar ratio in the support is in the range of 0.03:0.97-0.05:0.95. The composition of Fe:Al ratio of 0.03:0.97 gives a molar concentration of all elements as follow: 16.4% Ni, 1% Fe, 32.5% Al, and 50.1% O.

The precursor materials: Aluminum sec-butoxide ((Al(OCH($CH_3$)$C_2H_5$)$_3$, 98% pure), Ni(II) nitrate (Ni($NO_3$)$_2$.6$H_2O$, 99.8%), and Fe(III) nitrate (Fe($NO_3$)$_3$.9$H_2O$, 98%), and 2-propyl alcohol as a solvent.

The Preparation of the Invented Catalyst:

The Fe-doped $\gamma$-$Al_2O_3$ support was prepared via a sol-gel method. In a typical preparation 10 ml (0.039 mol) Al(OCH($CH_3$)$C_2H_5$)$_3$ was dissolved in 150 mL solution of 0.48 g (0.0011 mol) of Fe($NO_3$)$_3$.9$H_2O$ in 2-propyl alcohol. After mixing for 10 minutes, 2.8 ml of distilled water was added dropwise to the solution under continuous stirring. The mixture was stirred for 4 hours where a colloidal gel was obtained, which was aged for 24 hrs at room temperature in a covered beaker. The solvent was then removed by evaporation in a water bath at 80° C. The solid product was then dried in a furnace at 120° C. before calcination at 800° C. for 4 hrs.

The Ni was added to the support by wetness impregnation where 1.0 g of the calcined support was impregnated with 1.5 mL aqueous solution of the required amount of Ni($NO_3$)$_2$.6$H_2O$. The impregnated paste-like composite was aged for 24 hrs before drying at 120° C. for 2 hrs followed by calcination at 700° C. for 4 hrs.

The Preparation of the Refence Catalyst Ref. 1:

The Ref. 1 catalyst was prepared by the same procedure described above except that no Fe precursor was added during the preparation of the support, which was a pure $\gamma$-$Al_2O_3$.

The Preparation of the Refence Catalyst Ref. 2:

In the second reference catalyst, Ref. 2, the support was also pure $\gamma$-$Al_2O_3$ prepared according to the method described above. Fe was co-impregnated with Ni on the surface of the calcined pure $\gamma$-$Al_2O_3$, where 1.0 g of the support was impregnated with 1.5 ml of an aqueous solution of the required amounts of the precursors of both metals. In all studied catalysts, the support was calcined at 800° C. and after the addition of Ni by impregnation, the catalyst was calcined at 700° C.

EXPERIMENTAL EXAMPLES

The invented material (NiFeAl) was tested several times in the process of partial oxidation of methane to syngas at 700° C. The material was characterized by various techniques before and after reactions. Structural characteristics were investigated by powder X-ray diffraction, Uv-Vis-NIR and Raman spectroscopy, which assisted in identifying all phases that existed under different conditions. The textural and morphological characteristics were studied by $N_2$ sorption and transmission electron microscopy, which confirmed the formation of highly porous powders with relatively high surface areas and nano-scale particles of Ni on the surface of the support as shown in FIG. 1.

The surface acid-base characteristics of the catalyst were studied by temperature programmed desorption of $NH_3$ and $CO_2$. The reducibility of the catalyst was investigated by $H_2$-temperature programmed reduction.

Figure 2:
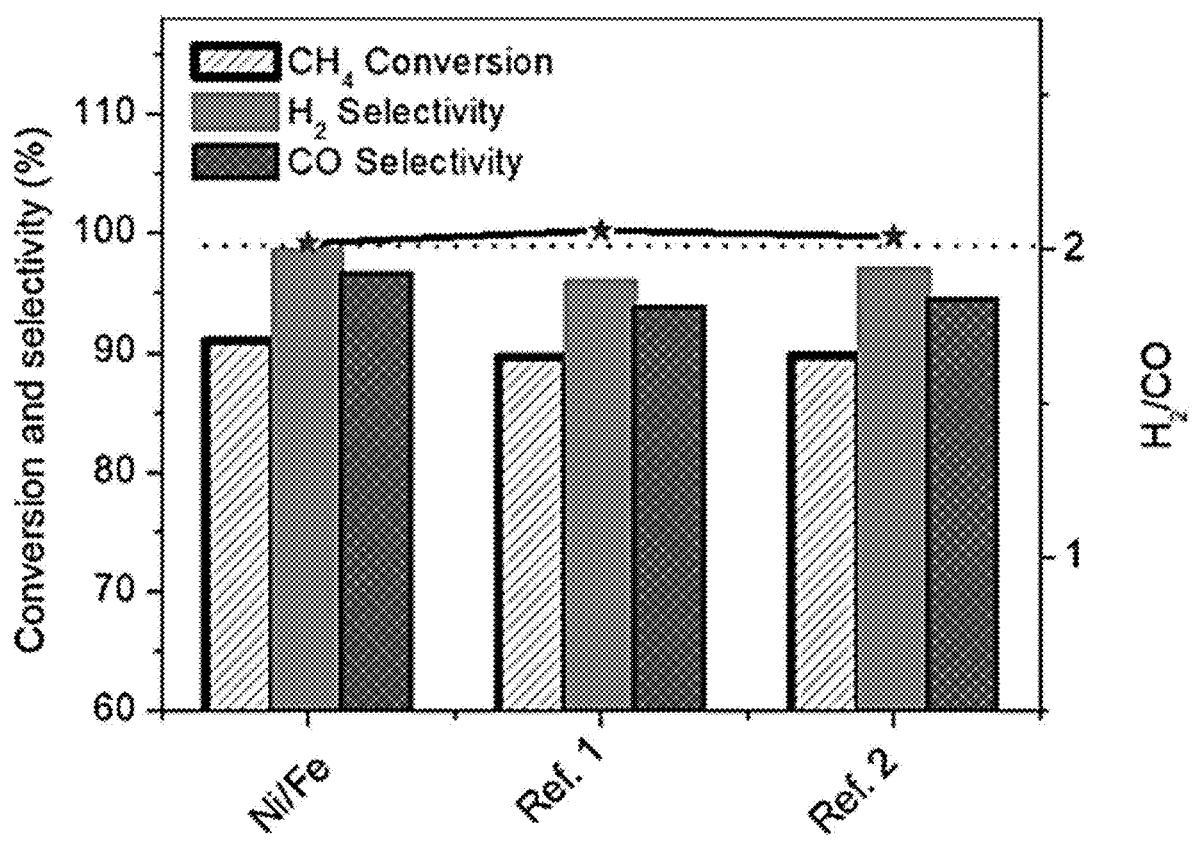
FIG. 2 Results of catalytic activity tests at 700° C. and 1 atm. The results in the plots are averages of $CH_4$ conversion, products' selectivity, and $H_2/CO$ ratio from 100-hr reactions.
Figure 3A:
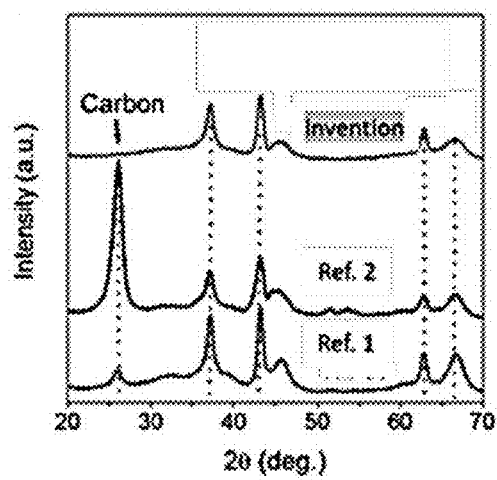
FIGS. 3A-3D Characteristics of spent catalysts after 100 hrs on-stream at 700° C., and 1 atm.
Figure 3B:
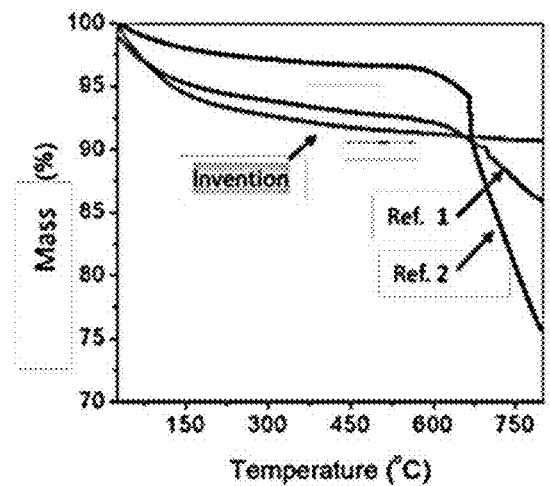
Figure 3C:
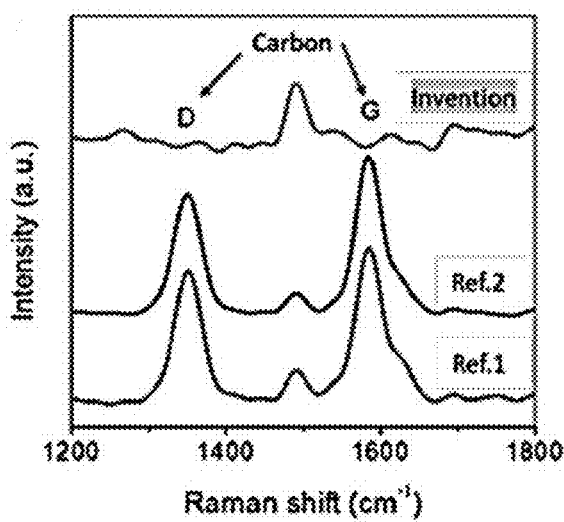
Figure 3D:
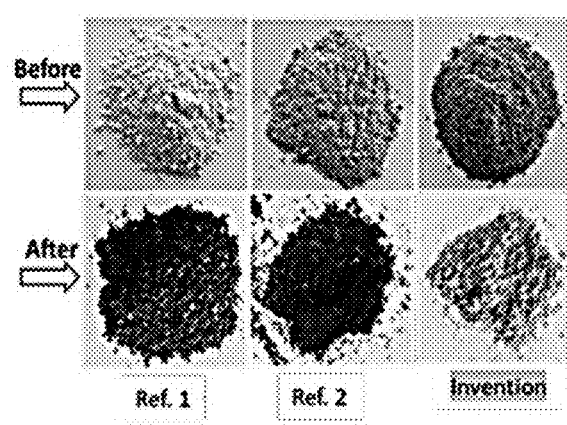

The catalytic performance of the catalyst was tested in 100-hr reactions using a continuous flow fixed bed reactor. The catalytic activity of the invented material was also compared with two reference catalysts. The first reference catalyst (Ref. 1) was composed of Ni supported over pure $\gamma$-$Al_2O_3$, which represents the most widely employed and investigated catalysts. The second reference catalyst (Ref. 2) was composed of Ni and Fe supported on the surface of the alumina support by co-impregnation of the precursors of both metals. It is noteworthy to mention that most reported studies that involved attempts to modify the Ni catalysts by doping with another metal have been prepared by the same method used here for the preparation of Ref. 2. While the three catalysts showed comparable $CH_4$ conversion during 100-hr reactions, the invented catalyst showed noticeable enhanced selectivity to syngas as shown in FIG. 2. Conversion of methane around 91% and syngas selectivity around 98% was continuously obtained. Interestingly, the invented catalytic materials showed the complete absence of carbon deposit on the catalyst during the reaction allowing very stable conversion and selectivity to syngas. However, considerable amounts of carbon accumulated on the reference catalysts that blocked the reactor, due to which the reaction was stopped after 100 hrs. The coke formation on the reference catalysts and its absence from the invented catalyst was confirmed by different experimental techniques as well as from the color of the samples before and after reactions as shown in FIGS. 3A-3D. The powder X-ray diffraction (XRD) pattern of the invented material shows the absence of the carbon characteristic peak at 2$\theta$-angle around 26°, while such peak is strongly evident in the patterns of the two reference catalysts, especially in Ref. 2. Thermal gravimetric analysis (TGA) shows the weight loss due to carbon combustion and removal from the spent catalysts. The weight loss at temperatures in the ranges of 250-400° C. and 400-800° C. is usually referred to soft and hard carbon, respectively. While the profiles of the two reference catalysts showed considerable weight loss, especially at high temperatures indicating considerable crystalline carbon deposits, the profile of the invented material shows almost zero weight loss indicating the absence of carbon, FIG. 3B. Raman spectra further confirms the absence of carbon in the spent invented material as indicated by the absence of the two typical peaks of carbon, which are shown by the spectra of the two reference catalysts. Furthermore, the picture of the new material after reaction confirms the absence of deposited carbon, while the two reference catalyst turned black due to the presence of coke.

REFERENCES

[1] A. Iulianelli, S. Liguori, J. Wilcox, A. Basile, Advances on methane steam reforming to produce hydrogen through membrane reactors technology, Catalysis reviews Science and Eng. 58 (2016) 1-35.

[2] A. Moral, I. Reyero, J. Llorca, F. Bimbela, L. M Gandía, Partial oxidation of methane to syngas using Co/Mg and Co/Mg—Al oxide supported catalysts, Catal. Today 333 (2019) 259-267.

[3] S. Rahmani, F. Meshkani, M. Rezaei, Preparation of Ni-M (M: La, Co, Ce, and Fe) catalysts supported on mesoporous nanocrystalline γ-$Al_2O_3$ for $CO_2$ methanation, Environ. Progress & Sustainable Energy 38 (2019) 118-126.

[4] C. G. Okoye, M. Moyo, X. Liu, D. Hildebrandt, A critical review of the impact of water on cobalt-based catalysts in Fischer-Tropsch synthesis, Fuel Processing Technology 192 (2019) 105-129.

[5] Y. Dou, Y. Pang, L. Gu, Y. Ding, W. Jiang, X. Feng, W. Ji, C. T Au, Core-shell structured Ru—Ni@$SiO_2$: Active for partial oxidation of methane with tunable $H_2$/CO ratio, J. Energy Chem 27 (2018) 883-889.

[6] H. Zhou, T. Zhang, Z. *Sui*, Y-A Zhu, C. Han, K. Zhu, X. Zhou, A single source method to generate Ru—Ni—MgO catalysts for methane dry reforming and the kinetic effect of Ru on carbon deposition and gasification, Appl. Catal. B Environ: 233 (2018) 143-159.

[7] O. Rocha, C. Marques, J. Bueno, Effect of Au doping of Ni/$Al_2O_3$ catalysts used in steam reforming of methane: mechanism, apparent activation energy, and compensation effect, ChemEngSci. 207 (2019) 844-852.

[8] C. A. Galvan, M. Melian, L. R. Matas, J. L. Eslava, R. M. Navarro, M. Ahmadi, B. R Cuenya, J. L. G. Fierro, Partial oxidation of methane to syngas over nickel-based catalysts: Influence of support type, addition of rhodium, and preparation method, Front Chem 7 (2019) 104.

[9] S. A. Theofanidis, J. A. Z. Pieterse, H. Poelman, A. Longo, M. K. Sabbe, M. Virginie, C. Detavernier, G. B Marin, Effect of Rh in Ni-based catalysts on sulfur impurities during methane reforming, Appl. Catal. B Environ: 267 (2020) 118691.

[10] C. Cheephat, P. Daorattanachai, S. Devahastin, N. Laosiripojana, Partial oxidation of methane over monometallic and bimetallic Ni—, Rh—, Rebased catalysts: effects of Re ddition, co-fed reactants and catalyst support, Appl. Catal A Gen: 563 (2018) 1-8.

[11] V. V. Thyssen, F. Georgetti, E. M. Assaf, Influence of MgO content as an additive on the performance of Ni/MgO—$SiO_2$ catalysts for the steam reforming of glycerol, J. Hydrogen Energy 42 (2017) 16979-16990.

[12] M. L. Dieuzeide, M. Jobbagy, N. Amadeo, Glycerol steam reforming over Ni/γ-$Al_2O_3$ catalysts, modified with Mg(II). Effect of Mg (II) content, Catal Today 213 (2013) 50-57.

[13] H. Sun, Q. Zhang, J. Wen, T. Tang, H. Wang, M. Liu, P Ning, L. Deng, Y. Shi, Insight into the role of CaO in coke-resistant over Ni-HMS catalysts for $CO_2$ reforming of methane, App Surface Sci 521 (2020) 146395.

[14] N. D. Charisiou, K. N. Papageridis, L. Tzounis, V. Sebastian, S. J. Hinder, M. A. Baker, M. AlKetbi, K. Polychronopoulou, M. A. Goula, Ni supported on CaO—MgO—$Al_2O_3$ as a highly selective and stable catalyst for $H_2$ production via the glycerol steam reforming reaction, J Hydrogen Energy 44 (2019) 256-273.

[15] M. Greluk, M. Rotko, S. Turczyniak-Surdacka, Enhanced catalytic performance of $La_2O_3$ promoted Co/$CeO_2$ and Ni/$CeO_2$ catalysts for effective hydrogen production by ethanol steam reforming, Renewable Energy 155 (2020) 378-395.

[16] L. Wang, R. Hu, H. Liu, Q. Wei, D. Gong, K. Mo, H. Tao, Z. Zhang, Encapsulated Ni@$La_2O_3$/$SiO_2$ catalyst with a one-pot method for the dry reforming of methane, Catalysts 10 (2020) 38.

What is claimed is:

1. A catalyst for use in the conversion of methane into synthesis gas, wherein:
    (1) the catalyst comprises Ni supported over Fe-doped γ-$Al_2O_3$;
    (2) the Ni concentration in the catalyst is 8 to 12% of the catalyst by weight;
    (3) the Fe:Al molar ratio in the support is in the range of 0.030:0.970-0.050:0.950;
    and wherein the Fe-doped γ-$Al_2O_3$ support was first prepared and the Ni($NO_3$)$_2$·6$H_2O$ was then added to the support.

2. The catalyst of claim 1, wherein the Ni concentration is 9 to 11% of the catalyst by weight.

3. The catalyst of claim 1, wherein the Ni concentration is 10% of the catalyst by weight.

4. The catalyst of claim 1, wherein the molar concentration of the elements of the catalyst is 16.4% Ni, 1% Fe, 32.5% Al, and 50.1% O.

5. The catalyst of claim 1, wherein:
    (1) efficiency of the conversion of methane into synthesis gas is 85 to 99%;
    (2) selectivity of the process of conversion of methane into synthesis gas ranges from 95 to 99%;
    (3) the synthesis gas produced has a $H_2$ to CO molar ratio of 2; and
    (4) an amount of carbon deposit produced in the process of conversion of methane into synthesis gas is zero.

6. The catalyst of claim 5, wherein the conversion of methane has an efficiency of 95 to 99%.

7. The catalyst of claim 5, wherein the process of conversion of methane into synthesis gas has an efficiency of at least 91%.

8. The catalyst of claim 5, wherein the process of conversion of methane into synthesis gas has a selectivity of at least 98%.

9. The catalyst of claim 5, wherein the synthesis gas is further processed to produce liquid fuels and other chemicals.

10. The catalyst of claim 1, wherein the process of conversion of methane into synthesis gas has a selectivity ranging from 97 to 99%.

11. A method for the conversion of methane ($CH_4$) into synthesis gas, comprising:
    preparing an Fe-doped γ-$Al_2O_3$ support;
    adding a nickel nitrate to the Fe-doped γ-$Al_2O_3$ support to form a catalyst; and
    bringing the methane gas into contact with the catalyst, wherein:
    (1) methane is converted into synthesis gas by partial oxidation;
    (2) efficiency of the process of conversion of methane into synthesis gas ranges from 85 to 100%;
    (3) selectivity of the process of conversion of methane into synthesis gas ranges from 95 to 100%;
    (4) an amount of carbon deposit produced in the process of conversion of methane into synthesis is minimal; and
    (5) the synthesis gas produced has a $H_2$ to CO molar ratio of 2.

12. The method of claim 11, wherein the process of conversion of methane into synthesis gas has an efficiency ranging from 90 to 95%.

13. The method of claim 11, wherein the process of conversion of methane into synthesis gas has a selectivity ranging from 97 to 99%.

14. The method of claim 11, wherein the process of conversion of methane into synthesis gas has an efficiency of at least 91%.

15. The method of claim 11, wherein the process of conversion of methane into synthesis gas has a selectivity of at least 98%.

16. The method of claim 11, wherein the synthesis gas is further processed to produce liquid fuels and other chemicals.

\* \* \* \* \*